(12) United States Patent
Kizhepat et al.

(10) Patent No.: US 7,543,250 B1
(45) Date of Patent: *Jun. 2, 2009

(54) ON-CHIP PACKET-BASED INTERCONNECTIONS USING REPEATERS/ROUTERS

(75) Inventors: Govind Kizhepat, Sunnyvale, CA (US); Omar M. Kinaan, Menlo Park, CA (US)

(73) Assignee: NetXen, Inc., Cupertino, CA (US)

( * ) Notice: Subject to any disclaimer, the term of this patent is extended or adjusted under 35 U.S.C. 154(b) by 194 days.

This patent is subject to a terminal disclaimer.

(21) Appl. No.: 11/283,210

(22) Filed: Nov. 18, 2005

Related U.S. Application Data

(63) Continuation of application No. 10/423,499, filed on Apr. 25, 2003, now Pat. No. 6,996,785.

(51) Int. Cl.
*G06F 17/50* (2006.01)
(52) U.S. Cl. .................. 716/1; 716/2; 716/4; 716/5; 716/6; 716/18; 703/13; 703/14
(58) Field of Classification Search ................ 716/1–2, 716/4–6, 18; 710/33; 703/13–14
See application file for complete search history.

(56) References Cited

U.S. PATENT DOCUMENTS

| | | | |
|---|---|---|---|
| 6,520,161 B2 * | 2/2003 | Hazama ..................... 123/509 |
| 6,587,912 B2 * | 7/2003 | Leddige et al. ................. 711/5 |
| 6,708,248 B1 * | 3/2004 | Garrett et al. ............... 711/104 |

* cited by examiner

*Primary Examiner*—Jack Chiang
*Assistant Examiner*—Nghia M Doan
(74) *Attorney, Agent, or Firm*—Law Office of Andrei D. Popovici, P.C.

(57) ABSTRACT

In some embodiments, multiple functional blocks (agents) in a complex integrated circuit are connected to a physically-distant shared resource (e.g. a memory controller) through packet buses which do not depend on establishing clock-cycle sequenced handshakes. On-chip repeaters including one or more register stages are used to segment the agent-shared resource interconnects into multiple segments, each shorter than a single-clock-cycle pathlength. The interconnects of multiple closely-spaced agents can be routed to the shared resource through an on-chip router having a single routed connection to the shared resource, for reducing the floorplan space taken by interconnects. The packet-based communications protocols do not require redesigning the agents or memory controller to make protocol changes accounting for the clock cycles inserted by repeaters and/or routers. Each agent can include a port register for storing a corresponding port number of the shared resource, to facilitate the host-programmable assignment of agents to shared resource ports.

26 Claims, 4 Drawing Sheets

FIG. 1-A
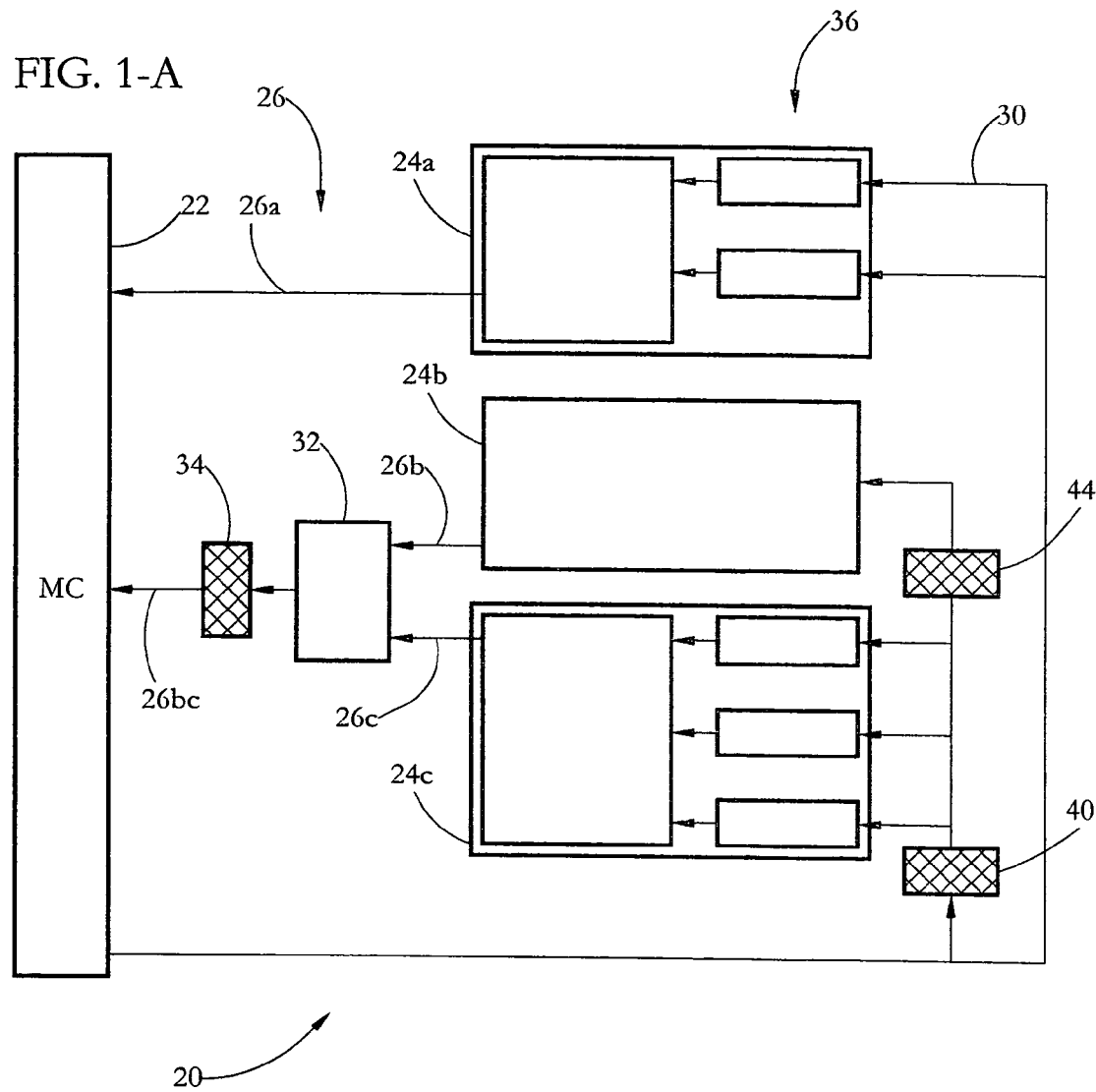

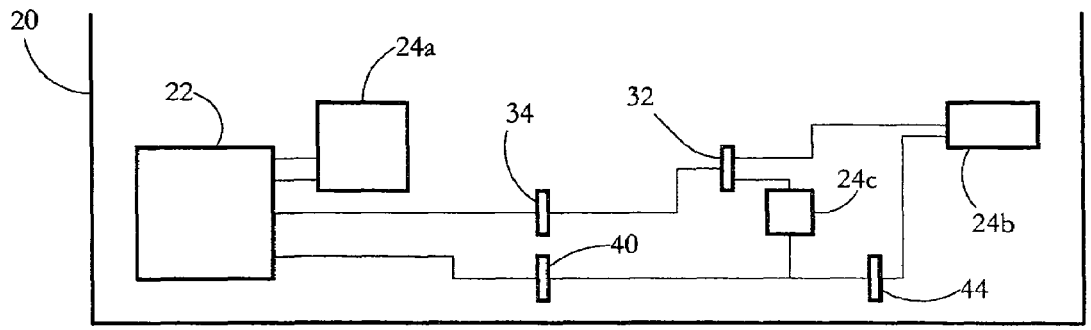
FIG. 1-B
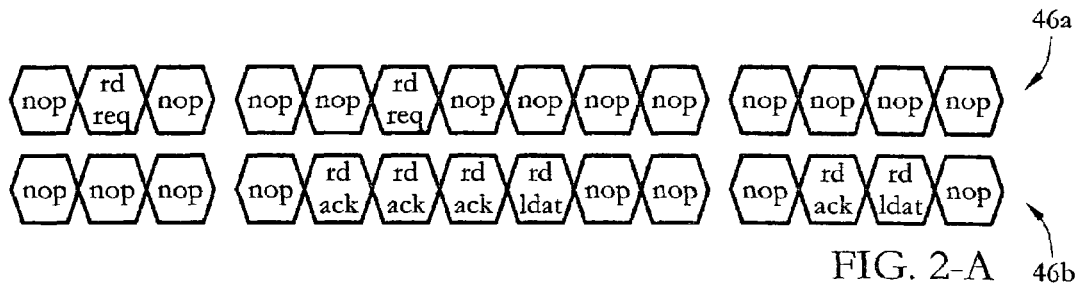
FIG. 2-A
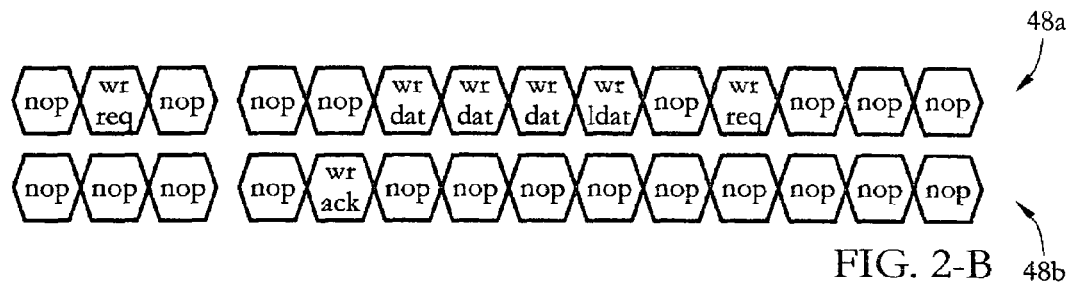
FIG. 2-B
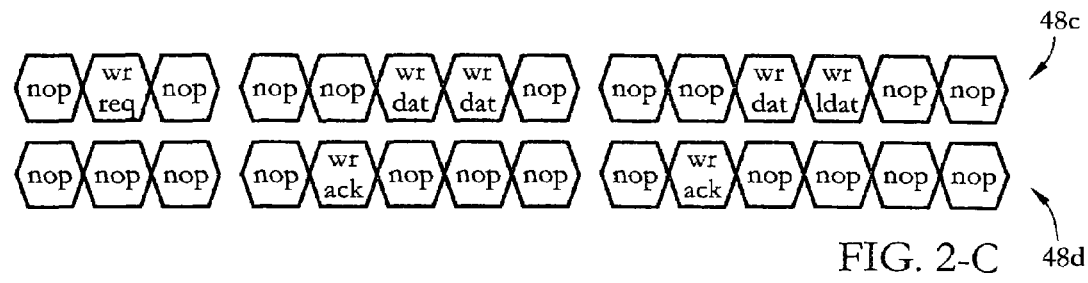
FIG. 2-C

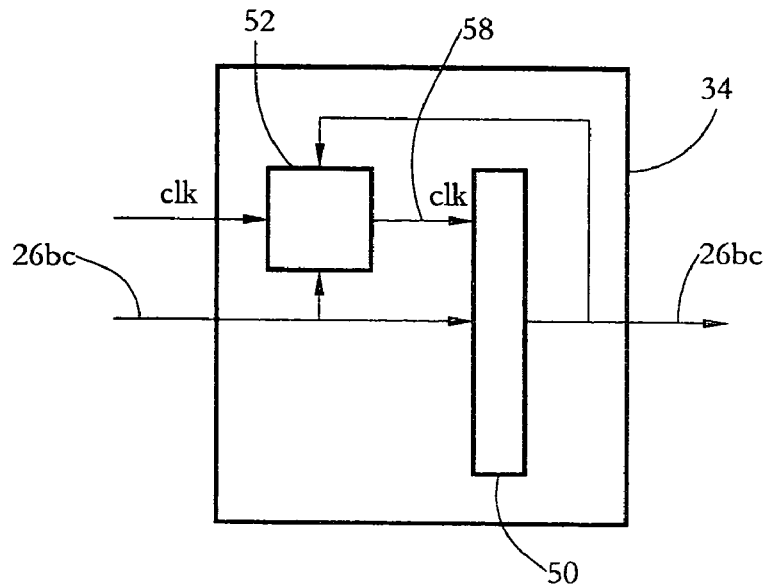
FIG. 3-A
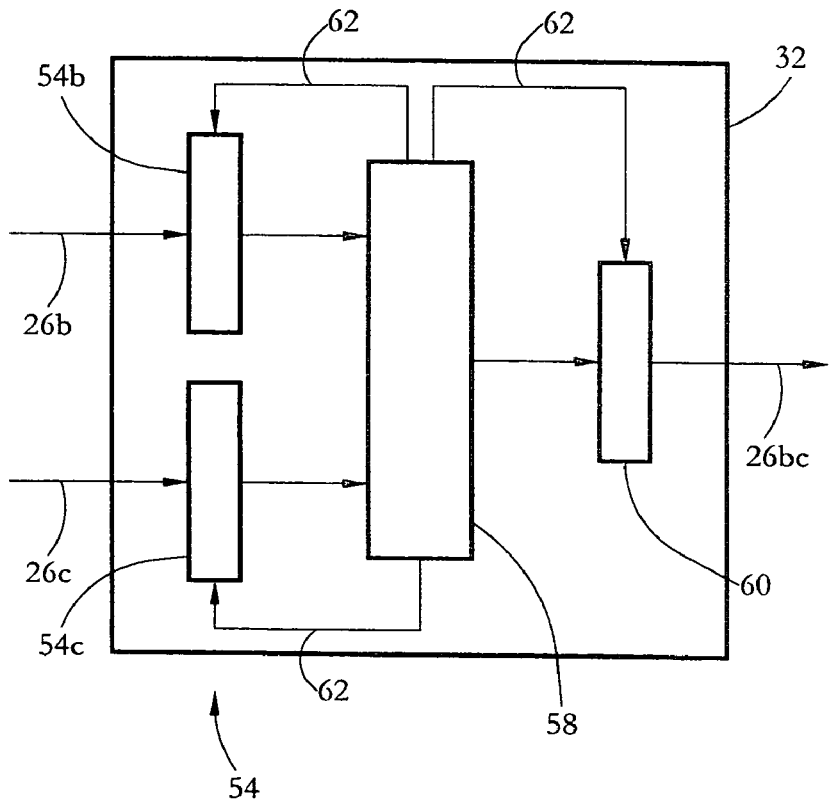
FIG. 3-B

ON-CHIP PACKET-BASED INTERCONNECTIONS USING REPEATERS/ROUTERS

RELATED APPLICATION DATA

This application is a Continuation of U.S. patent application Ser. No. 10/423,499, filed on Apr. 25, 2003, now U.S. Pat. No. 6,996,785 B1, issued Feb. 7, 2006, entitled "On-Chip Packet-Based Interconnections using Repeaters/Routers," which is herein incorporated by reference.

FIELD OF THE INVENTION

The invention in general relates to chips and their design, and in particular to systems and methods for designing integrated circuits and interconnecting functional blocks of integrated circuits.

BACKGROUND

The design of modern integrated circuits can be significantly constrained by interconnect signal propagation delays. Signal propagation delays arise due to the resistance and capacitive coupling of interconnects connecting different parts (e.g. functional blocks) of a chip, and are commonly called RC delays. RC effects can also affect the amplitude or waveshape of the transmitted signals. Addressing RC effects is becoming increasingly important as the gate counts, clock speeds and chip sizes of integrated circuits continue to grow.

Signal repeaters such as buffers or inverters can be inserted in the signal paths between different functional blocks physically situated on distant parts of a chip. Since propagation delays typically increase non-linearly (e.g. quadratically) with signal path length, inserting such repeaters reduces the time required for signals to travel between the functional blocks. Nevertheless, as chip sizes and clock speeds increase, such signal repeaters may not be adequate for meeting timing constraints imposed by functional block communications protocols. Redesigning such communications protocols and/or chip layouts can add significant complexity, time, and cost to the design of integrated circuits. For information on integrated circuits and design methods employing signal repeaters see for example U.S. Pat. Nos. 6,473,889, 6,463,574, 6,449,769, 6,412,101, 6,408,426, 6,145,116, and 6,009,253.

SUMMARY OF THE INVENTION

In some embodiments, an integrated circuit comprises: a shared resource functional block (e.g. a memory controller), a plurality of agent functional blocks connected to the shared resource over dedicated packet-based buses; and a repeater including a register stage situated in a data path defined by a packet-based bus between an agent and the shared resource, for receiving a data packet on a first clock cycle, and selectively transmitting the data packet on a second clock cycle subsequent to the first clock cycle. The packet is received from the agent or the shared resource, and sent to the shared resource or the agent. The communications protocol between the shared functional block and each agent functional block is substantially independent of the presence of the repeater between the agent and shared resource. One or more repeaters may be inserted in the path between an agent and the shared resource without re-designing the communications protocol between the agent and the shared resource. The repeater may include or form part of a router connecting multiple agents to a common time-multiplexed bus connected to a routed port of the shared resource.

BRIEF DESCRIPTION OF THE DRAWINGS

The foregoing aspects and advantages of the present invention will become better understood upon reading the following detailed description and upon reference to the drawings where:

FIG. 1-A is a schematic diagram of an exemplary integrated circuit according to an embodiment of the present invention.

FIG. 1-B shows schematically a possible on-chip physical arrangement of several functional blocks of the system of FIG. 1-B, according to an embodiment of the present invention.

FIG. 2-A is a timing diagram illustrating an exemplary memory read operation according to an embodiment of the present invention.

FIGS. 2-B-C are timing diagrams illustrating exemplary memory write operations according to an embodiment of the present invention.

FIG. 3-A shows the internal structure of an on-chip repeater stage according to a preferred embodiment of the present invention.

FIG. 3-B shows the internal structure of an on-chip router according to a preferred embodiment of the present invention.

DETAILED DESCRIPTION OF THE INVENTION

Figure 4:
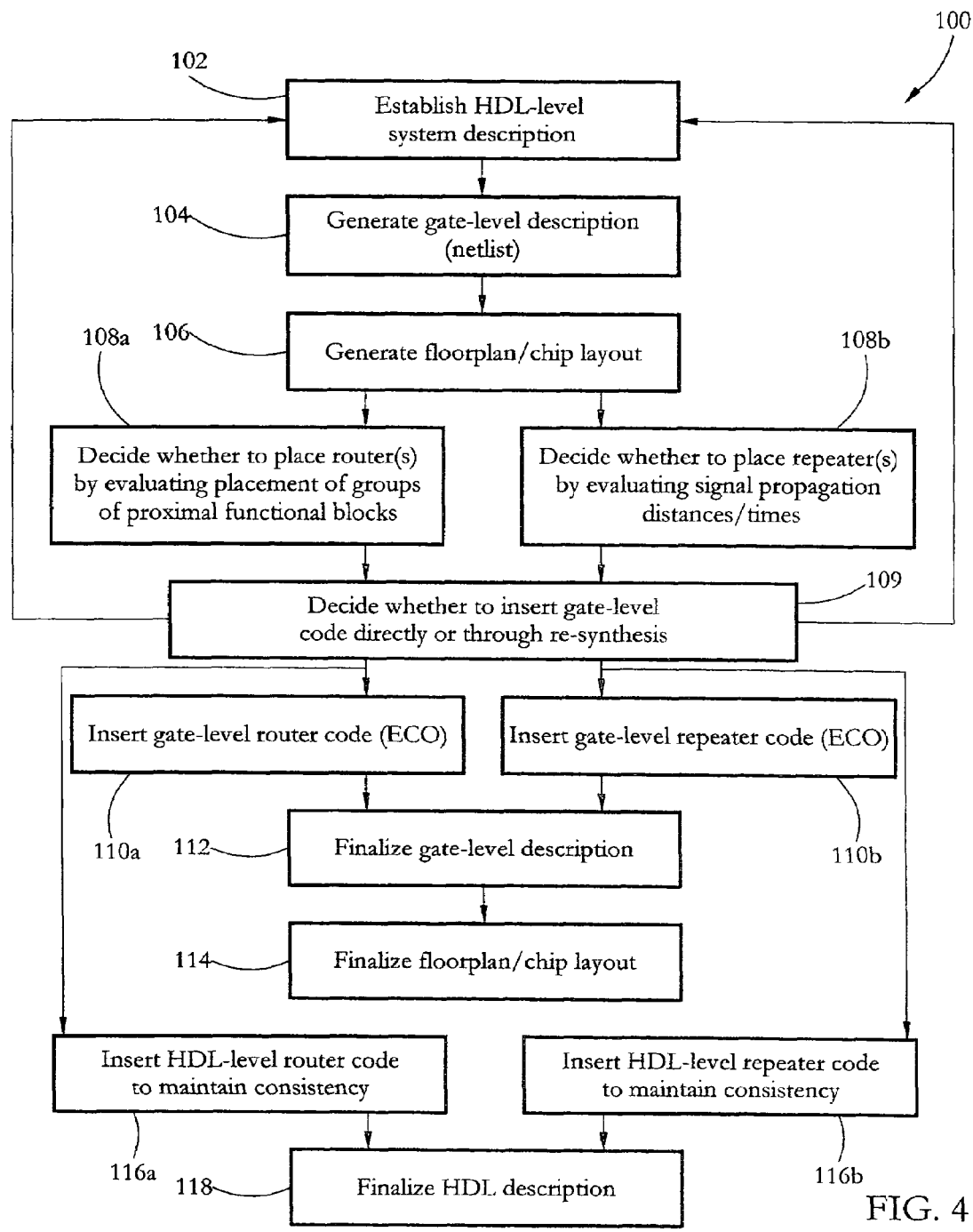
FIG. 4 shows a schematic diagram of a chip design method according to an embodiment of the present invention.

In the following description, it is understood that all recited connections between structures can be direct connections or indirect connections through intermediary structures. A set of elements includes one or more elements. Any recitation of an element is understood to refer to at least one element. As used below, a repeater can include a router, and a router can include a repeater.

The following description illustrates embodiments of the invention by way of example and not necessarily by way of limitation.

FIG. 1-A shows a schematic illustration of an exemplary integrated circuit system 20 according to an embodiment of the present invention. System 20 includes a shared resource functional block such as a memory controller (memory interface unit) 22, and a plurality of agent functional blocks 24a-c connected to memory controller 22 through a plurality of corresponding output and input buses (interconnects) 26, 30. Memory controller 22 is further connected to a random access memory (RAM) such as static random access memory (SRAM) or dynamic random access memory (DRAM). Examples of DRAM include synchronous dynamic random access memory (SDRAM) such as single-data rate (SDR) or double data rate (DDR) SDRAM. Memory controller 22 controls the access of agents 24a-c to the shared DRAM. The following discussion focuses on a memory controller for illustrative purposes. The repeaters, routers, and associated communications protocols and design systems and methods described below can be used in general to interconnect other functional blocks, such as data processing blocks.

The lengths of the various connections illustrated in FIG. 1-A do not necessarily reflect the physical, on-chip lengths of the connections. For example, the on-chip lengths of the connections between memory controller 22 and agent 24a can be substantially shorter than those between memory controller 22 and agents 24b-c. FIG. 1-B illustrates schematically a set of possible on-chip relative positions of the various functional blocks shown in FIG. 1-A.

As shown in FIG. 1-A, agent 24a is connected to memory controller 22 through a dedicated multi-bit output packet bus 26a. Agents 24b-c are connected to memory controller 22 through an on-chip router 32 and an on-chip synchronous repeater (repeater stage) 34. Repeater 34 preferably includes a register stage and power control logic, while router 32 includes routing/arbitration logic, one or two register stages, and power control logic, as described in further detail below. In particular, repeater 34 and router 32 each introduce one or more clock cycles into their associated data transmission times. Preferably, repeater 34 transmits data in the clock cycle immediately following receipt of the data, while router 32 transmits data two clock cycles after receipt of the data.

Agents 24b-c are connected to router 32 through respective, dedicated multi-bit output packet buses 26b-c. A common, routed output multi-bit packet bus 26bc connects router 32 to repeater 34 and memory controller 22. Agents 24a-c employ packet buses 26 to transmit memory access (write and/or read) packets containing commands and/or associated data to memory controller 22. Agents 24a-c are preferably further connected to memory controller 22 through a set of corresponding subagents 36 and a common input packet bus 30. Subagents 36 are functional blocks within agents 24a-c that are capable of separately accessing data received from memory controller 22. Data transmitted over packet bus 30 can include a subagent tag identifying a subagent destination for the data. A subagent 36 may perform processing and/or route received data to other parts of its corresponding agent 24a-c. Packet bus 30 can be segmented into multiple physical stages by one or more repeaters 40, 44. Memory controller 22 employs packet bus 30 to transmit write acknowledge packets and memory read packets to agents 24a-c in response to memory access packets received over input buses 26.

The interblock communication protocols used over packet buses 26, 30 do not depend on meeting any predetermined clock cycle relationships or establishing handshakes between the agents 24a-c and memory controller 22. Agents 24a-c and memory controller 22 send data to each other as packets, which in general can take any number of clock cycles to arrive at their destination. Consequently, in general any number of repeater register stages and/or routers can be inserted into buses 26, 30 to segment the buses into shorter stages (buses), without requiring the redesign of the communications protocols used by agents 24a-c and memory controller 22. Preferably, a packet is valid (sent) for only one clock cycle. It is up to the packet's receiver to decide when a new packet has arrived, and to latch the packet.

Preferably, each packet bus 26, 30 includes multiple fields (bit ranges) for transmitting different corresponding fields of packets. In a presently preferred implementation, packets sent from agents 24a-c to memory controller 22 include a target (memory controller) tag, an opcode (operation code), and a payload, while packets sent from memory controller 22 to agents 24a-c include an agent tag, a memory controller tag, an opcode, and a payload. Input bus 30 can have a larger width than output buses 26, in order to allow the transmission of extra fields. In an exemplary implementation, each output bus 26 is 79-bit wide while input bus 30 is 81-bit wide. Preferably, routed bus 26bc has a larger width than the single-agent buses 26a-c, to allow for additional routing information to be transmitted in the packet headers transmitted by router 32. In one exemplary implementation, routed bus 26bc is 83-bit wide. Memory controller 22 then includes demultiplexing logic connected to the 2-bit routing field of routed bus 26bc, for directing incoming packets to one of four sets of input registers, each corresponding to one of four agents that could be connected to router 32. Router 32 adds a 2-bit routing tag to all incoming packets, identifying the agent corresponding to each packet. Preferably, memory controller 22 has a number of direct, single-agent (non-routed) ports, and one or more routed ports each connected to a corresponding router. Each routed port corresponds to a number (e.g. 4) of virtual unrouted ports each assigned to an agent. Thus, each agent 24a-c may be assigned a memory controller port number uniquely identifying the agent.

Preferably, each agent 24a-c is assigned a unique agent tag or address, which can be host-programmable (software-programmable) after system 20 has been designed and manufactured. An agent tag preferably includes a port tag indicating which port of memory controller 22 the agent is connected to, and a sub-agent tag used to route input data to an appropriate sub-agent 36. The sub-agent tag is received by memory controller 22 from the corresponding agent as part of the output packet's payload. Memory controller 22 associates a request packet with an agent tag based on the requesting agent's input port connection and the received sub-agent tag. A packet sent by memory controller 22 to an agent includes both an appropriate port tag and a sub-agent tag. In an exemplary implementation, each of the sub-agent tag and the port tag corresponds to a five-bit bus field, for total of 10-bits in an agent tag. Such a scheme corresponds to 32 ($2^5$) memory controller ports and 32 sub-agents per agent/port. A memory controller tag indicates which memory controller an output packet is targeting. In general, one output bus could be connected to multiple memory controllers or other shared resources. Each agent 24a-c preferably includes a programmable port register for storing the agent tag identifying a corresponding memory controller port. Allowing the agent tag to be host-programmable allows assigning a memory controller port to each agent after the design of system 20, such that port assignment changes do not require re-synthesizing a gate-level description of system 20.

Operation codes (opcodes) characterize the memory access operation corresponding to a packet. Exemplary opcodes for output (agent to controller) packets include NOP (no operation), WRITE DATA, READ MEMORY REQUEST, WRITE MEMORY REQUEST, and WRITE LAST DATA (transmitted data is the last data for a write transaction). Exemplary opcodes for input (controller to agent) packets include NOP, WRITE ACKNOWLEDGE (Ok to send data), READ ACKNOWLEDGE (different opcodes can signal whether data in payload is error-free or contains uncorrectable error), and READ LAST DATA (data in payload is the last data for a read transaction; different opcodes can signal the presence or absence of an error).

Payloads represent transmitted data, and can be dependent on the corresponding opcode. Exemplary payload components for a read request packet include sub-agent tag, memory address (address of starting memory word), and data count (number of words to be read from memory). Exemplary payload components for a write memory request packet include sub-agent tag, memory address, and data count. Exemplary payload components for a write data payload include write data byte enable and write data (the data to be written). A read acknowledge payload can include the data to be read. A write acknowledge payload can include the data count of the data to be written. As is apparent to the skilled artisan, the preceding description of packet fields is presented for illustrative purposes only. In general, other fields can be used for memory controller or other shared resource applications.

Preferably, memory controller 22 includes first-in first-out (FIFO) command and data registers for storing memory access commands received from agents 24a-c, and an agent arbiter connected to the command and data registers. The agent arbiter selects one agent 24a-c per clock cycle for providing access to memory. If the agent is requesting a read from memory, the agent arbiter receives a read command packet over its corresponding bus 26, and posts the read command to the command register. Once the read command has been completed by the memory, memory controller 22 sends the data in one or more packets over output bus 30. If the agent is requesting a write to memory, the agent posts its request over a corresponding input bus 26 and waits to receive a write acknowledge packet. When the agent arbiter has selected the agent for access to the memory, the write acknowledge packet is sent over output bus 30. The agent sends the data to be written as one or more sequential packets over its corresponding input bus 26. The write command is posted to the command register, while the corresponding write data is posted to the data register of memory controller 22. Once the agent has sent all its data, the agent considers the write command complete.

FIG. 2-A is a timing diagram illustrating an exemplary four quad word memory read command followed by a two quad word memory read command. A first command sequence 46a shows commands transmitted over from an agent to the memory controller over an output bus, while a second commands sequence 46b shows commands transmitted from the memory controller to the agent over an input (response) bus. An agent sends a READ REQUEST packet on the second clock cycle of sequence 46a. After a number of clock cycles defining a memory access time, the memory controller sends four data packets (3 READ ACKNOWLEDGE and 1 READ LAST DATA), shown in the middle of sequence 46b. A subsequent READ REQUEST packet sent by the agent causes the memory controller to send two data packets (1 READ ACKNOWLEDGE and 1 READ LAST DATA) on a subsequent clock cycle.

FIGS. 2-B and 2-C are timing diagrams illustrating an exemplary four quad word memory write command executed in a single write sequence and in two distinct write sequences, respectively. Command sequences 48a,c show commands transmitted from an agent to the memory controller, while command sequences 48b,d show commands transmitted from the memory controller to the requesting agent. As shown in FIG. 2-B, the agent sends a WRITE REQUEST packet requesting to write 4 words. After receiving a WRITE ACKNOWLEDGE packet with a data count larger than or equal to 4, the agent sends four consecutive WRITE DATA packets each containing one of the words to be written. In the command sequence of FIG. 2-C, the agent receives a first WRITE ACKNOWLEDGE packet with a data count equal to 2, and sends two WRITE DATA packets in response. After receiving a second WRITE ACKNOWLEDGE packet with a data count equal to 2, the agent sends the last two WRITE DATA packets containing the data to be written to memory.

FIG. 3-A shows the internal structure of repeater 34 according to a preferred embodiment of the present invention. Repeater 34 includes a register stage 50 and clock gating logic 52 connected to register stage 50. Register stage 50 segments output bus 26bc (shown in FIG. 1-A) into separate stages. The input and output of register stage 50 form the input and output, respectively, of repeater 34. Clock gating logic 52 has three inputs: a first input connected to the input of register 50, a second input connected to the output of register 50, and a third input connected to a clock source. Clock gating logic 52 further has an output connected to a clock gating port of register 50. Clock gating logic 52 includes logic (e.g. a comparator and associated logic) for comparing the input and output signals of register 50, and turning off the clock signal to register 50 if both the input and output opcodes are NOP (no operation), indicating that no data needs to be received or transmitted by register 50. The use of clock gating logic 52 allows reducing the amount of power consumed by repeater 34 during clock cycles in which repeater 34 is not needed.

FIG. 3-B shows the internal structure of router 32 according to a preferred embodiment of the present invention. Router 32 preferably includes two register stages 54, 60, and arbitration/routing logic 58 connecting register stage 54 to register stage 60. Register stage 54 includes two registers 54b-c having their inputs connected to output buses 26b-c, respectively. The outputs of registers 54b-c are preferably connected to plural inputs of arbitration logic 58, while an output of arbitration logic 58 is connected to the input of register 60. The output of register 60 is connected to output bus 26bc. Arbitration logic 60 is also connected to registers 54, 60 over reset connections 62, for resetting registers 54, 60.

Packets received over buses 26b-c are loaded into registers 54b-c, respectively. Arbitration logic 58 arbitrates the packets, and selects one packet at a time for loading from a register 54 into register 60 one clock cycle after the packet has been loaded into the register 54. Higher priority is preferably given to write data and write last data packets than to other packets, since write packets are preferably sent only once. The selected packet is transmitted from register 60 one clock cycle after loading. Arbitration logic 58 resets each register 54, 60 after its respective packet has been transmitted. A second register 60 is preferably used in router 32 so that the transmission time between router 32 and subsequent data recipients is not dependent on any delay caused by arbitration logic 58.

FIG. 4 illustrates a method 100 of designing an integrated circuit such as system 20 according to an embodiment of the present invention. In a first step 102, a hardware design language (HDL) description of system 20 is established from a functional specification of system 20. The HDL description can be implemented in an HDL language such as Verilog or VHDL. In a subsequent step 104, the HDL-level description is synthesized into a gate-level description of system 20 using commercially-available synthesis tools. The gate-level description is then used to generate a tentative floorplan or chip layout using available layout tools (step 106). Various simulation and verification steps may be performed in the process of generating the chip layout from the functional and HDL specifications, as is known in the art. The floorplan generated in step 106 includes a plurality of functional block sizes, locations and tentative interconnection paths between functional blocks, as illustrated for example in FIG. 1-B. The tentative floorplan does not include routers or single-agent repeaters.

In a set of steps 108a-b, the floorplan and its interconnects are evaluated to determine whether routers and/or single-agent repeaters should be placed to reduce the chip floorspace taken up by signal paths and/or to break up interconnects corresponding to signal propagation delays longer than one clock cycle. Steps 108a-b are preferably performed concurrently, but may also be performed sequentially. An engineer may inspect the floorplan to determine whether and where to add routers and/or single-agent repeaters. The evaluation can include selecting various agent groupings, identifying an optimal agent grouping, and assigning the optimal agent grouping to a router. An engineer can then determine whether to generate appropriate router and/or repeater gate-level descriptions directly, or by re-synthesizing HDL code (step 109). In the initial design stages, the router/repeater descriptions are preferably inserted at the HDL level. Preferably, steps 102-109 are performed iteratively until the system netlist is sufficiently stable, bug-free, and the physical design is satisfactory. If no additional routers/repeaters are needed, the system netlist incorporating the inserted routers and/or single-agent repeaters is then finalized (step 112), and a final floorplan is generated from the final netlist (step 114).

A designer desiring to insert routers and/or single-agent repeaters relatively late in the design process can insert gate-level router/repeater code directly into the netlist, and update the HDL system description to reflect the additions. In a set of steps 110a-b, the system netlist can be updated directly by inserting gate-level router and single-agent repeater code implementing the design choices performed in steps 108a-b. Steps 110a-b may be performed concurrently or sequentially. Steps 108a-b, 110a-b can be performed manually by an engineer, for example through an engineering change order (ECO). The system description is then finalized as described above (steps 112, 114). In a set of steps 116a-b, the HDL-level system description generated in step 102 can be manually or automatically updated to reflect the netlist changes performed in steps 110a-b, in order to maintain internal consistency between the HDL-level description and the netlist. The updated HDL-level description is preferably not re-synthesized.

Preferably, the final floorplan differs from the tentative floorplan only through the presence of the added routers and/or single-agent repeaters, and not in the sizes or positions of the various functional blocks. Routers and single-agent repeaters are typically much smaller (e.g. $10^2$-$10^4$ smaller) in area than system functional blocks. Consequently, inserting the routers and/or single agent repeaters ordinarily does not significantly increase the die area required by the system. Moreover, if the packet-based communications protocols used between agents and shared resources are independent of the number of clock cycles needed for packet travel between source and destination, inserting routers and/or single agent repeaters (and thus adding one or more clock cycles to the packet travel time) does not require altering any agent or shared resource code or communications protocol.

It will be clear to one skilled in the art that the above embodiments may be altered in many ways without departing from the scope of the invention. Various shared resources other than memory controllers may be used, such as queue managers, control units, and any other functional blocks. An agent may also be in turn a shared resource, and a shared resource can be thought of as a type of agent. Accordingly, the scope of the invention should be determined by the following claims and their legal equivalents.

What is claimed is:

1. A synchronous apparatus integrated on a chip, comprising:
    a plurality of agent functional blocks integrated on the chip and connected to a shared functional block through a corresponding plurality of unidirectional packet buses; and
    a set of repeaters integrated on the chip, the set of repeaters including a repeater comprising a register positioned to segment a packet bus connecting an agent functional block and the shared functional block, the repeater receiving a packet from a first unit on a first clock cycle, the repeater transmitting the packet to a second unit on a second clock cycle subsequent to the first clock cycle, wherein the first unit and the second unit are selected from the agent functional block and the shared functional block;
    wherein a communications protocol between the shared functional block and the agent functional block is substantially capable of operation for a source-receiver traveltime having a first value and a second value, wherein the first value is a first number of clock cycles defining a signal traveltime between the shared functional block and agent functional block through the repeater, and the second value is a second number of clock cycles different from the first number of clock cycles;
    wherein a first physical connection distance between the repeater and the agent functional block over the packet bus does not exceed a single-clock-cycle length; and
    wherein a second physical connection distance between the shared functional block and the agent functional block over the packet bus exceeds the single-clock-cycle length.

2. The apparatus of claim 1, wherein the set of repeaters comprises a plurality of repeaters positioned to segment the packet bus connecting the agent functional block and the shared functional block.

3. The apparatus of claim 1, wherein the set of repeaters consists of the repeater.

4. The apparatus of claim 1, wherein the shared functional block comprises a memory controller, and each of the agent functional blocks comprises a memory client capable of transmitting memory read and memory write commands to the memory controller through the repeater.

5. The apparatus of claim 1, wherein the repeater comprises a router connecting at least two agent functional blocks to the shared functional block, the router being connected to the shared functional block over a shared, time-multiplexed unidirectional packet bus, the router comprising arbitration logic for arbitrating a transmission of packets from the at least two agent functional blocks to the shared functional block.

6. The apparatus of claim 5, wherein the router comprises:
    an input register stage comprising a plurality of registers each connected to one of the at least two agent functional blocks;
    arbitration logic connected to the input register stage, for selecting for transmission on a clock cycle a single packet corresponding to one of the plurality of registers of the input register stage, and for adding to the single packet a sender tag identifying a sender of the single packet; and
    an output register stage comprising an output register connected to the shared functional block, for receiving the single packet from the arbitration logic.

7. The apparatus of claim 1, further comprising a router connecting at least two agent functional blocks to the shared functional block, the router being connected to the shared functional block over a shared, time-multiplexed unidirectional packet bus, the router comprising arbitration logic for arbitrating a transmission of packets from the at least two agent functional blocks to the shared functional block.

8. The apparatus of claim 1, wherein the repeater comprises clock gating logic connected to the register, for gating a clock signal to the register selectively if the packet presently stored in the register is a no-operation packet and an incoming packet is no-operation packet.

9. The apparatus of claim 1, wherein the second clock cycle immediately follows the first clock cycle.

10. The apparatus of claim 1, wherein the second clock cycle is two clock cycles later than the first clock cycle.

11. The apparatus of claim 1, further comprising an additional repeater integrated on the chip, comprising an additional register positioned to segment the packet bus connecting the agent functional block and the shared functional block.

12. The apparatus of claim 1, wherein the repeater is a single-agent repeater.

13. The apparatus of claim 1, further comprising the shared functional block.

14. A synchronous apparatus integrated on a chip, comprising:
   a first functional block integrated on the chip;
   a second functional block integrated on the chip and connected to the first functional block through a unidirectional packet bus; and
   a repeater integrated on the chip, comprising a register positioned to segment the packet bus, for receiving a packet from the first functional block on a first clock cycle, and transmitting the packet to the second functional block on a second clock cycle subsequent to the first clock cycle;
   wherein a communications protocol between the first functional block and the second functional block is substantially capable of operation for a source-receiver traveltime having a first value and a second value, wherein the first value is a first number of clock cycles defining a signal traveltime between the first functional block and second functional block through the repeater, and the second value is a second number of clock cycles different from the first number of clock cycles;
   wherein a first physical connection distance between the repeater and the first functional block over the packet bus does not exceed a single-clock-cycle length; and
   wherein a second physical connection distance between the first functional block and the second functional block over the packet bus exceeds the single-clock-cycle length.

15. The apparatus of claim 14, wherein the first functional block comprises a memory controller, and the second functional block comprises a memory client capable of transmitting memory read and memory write commands to the memory controller through the repeater.

16. The apparatus of claim 14, wherein the repeater comprises a router connecting a third functional block integrated on the chip and the second functional block to the first functional block, the router being connected to the first functional block over a first, time-multiplexed unidirectional packet bus, the router comprising arbitration logic for arbitrating a transmission of packets from the second functional block and the third functional block to the first functional block.

17. The apparatus of claim 16, wherein the router comprises:
   an input register stage comprising a first register connected to the second functional block and a second register connected to the third functional block;
   arbitration logic connected to the input register stage, for selecting for transmission on a clock cycle a single packet corresponding to one of the first register and the second register, and adding to the single packet a sender tag identifying a sender of the single packet; and
   an output register stage comprising a third register connected to the first functional block, for receiving the single packet from the arbitration logic.

18. The apparatus of claim 14, further comprising a router connecting a third functional block integrated on the chip and the second functional block to the first functional block, the router being connected to the first functional block over a first, time-multiplexed unidirectional packet bus, the router comprising arbitration logic for arbitrating a transmission of packets from the second functional block and the third functional block to the first functional block.

19. The apparatus of claim 14, wherein the repeater comprises clock gating logic connected to the register, for gating a clock signal to the register selectively if the packet presently stored in the register is a no-operation packet and an incoming packet is no-operation packet.

20. The apparatus of claim 14, wherein the second clock cycle immediately follows the first clock cycle.

21. The apparatus of claim 14, wherein the second clock cycle is two clock cycles later than the first clock cycle.

22. The apparatus of claim 14, further comprising an additional repeater integrated on the chip, comprising an additional register positioned to segment the packet bus connecting the first agent functional block and the second agent functional block.

23. The apparatus of claim 14, wherein the repeater is a single-agent repeater.

24. A synchronous apparatus integrated on a chip, comprising:
   shared means integrated on the chip, for performing a first set of data processing operations;
   plural agent means integrated on the chip and connected to the shared means through a corresponding plurality of unidirectional communications means, for performing a second set of data processing operations; and
   repeater means integrated on the chip, comprising a register positioned to segment a communications means connecting an agent means and the shared means, for receiving a packet from the shared means or the agent means on a first clock cycle, and transmitting the packet to the shared means or the agent means on a second clock cycle subsequent to the first clock cycle; wherein
   a first physical connection distance between the repeater means and the agent means over the packet bus does not exceed a single-clock-cycle length;
   a second physical connection distance between the shared means and the agent means over the packet bus exceeds the single-clock-cycle length; and
   wherein a communications protocol between the agent means and the shared means is substantially capable of operation for a source-receiver traveltime having a first value and a second value, wherein the first value is a first number of clock cycles defining a signal traveltime between the shared means and agent means through the repeater means, and the second value is a second number of clock cycles different from the first number of clock cycles.

25. A synchronous apparatus integrated on a chip, comprising:
   a memory controller integrated on the chip;
   a plurality of memory clients integrated on the chip and connected to the memory controller through a corresponding plurality of unidirectional packet buses; and
   a repeater integrated on the chip, comprising a register positioned to segment a packet bus between a memory client and the memory controller, the repeater receiving a packet from a first unit on a first clock cycle, the repeater transmitting the packet to a second unit on a second clock cycle subsequent to the first clock cycle, wherein the first unit and the second unit are selected from the memory client and the memory controller; wherein:
   a first physical connection distance between the repeater and the memory client over the packet bus does not exceed a single-clock-cycle length;
   a second physical connection distance between the memory controller and the memory client over the packet bus exceeds the single-clock-cycle length; and
   wherein a communications protocol between the memory controller and the memory client is substantially capable of operation for a source-receiver traveltime having a first value and a second value, wherein the first value is a first number of clock cycles defining a signal traveltime between the memory controller and memory client through the repeater and the second value is a second number of clock cycles different from the first number of clock cycles.

26. An on-chip data communications method comprising:

transmitting a data packet from a first functional block integrated on a chip over a first segment of a unidirectional packet bus;

receiving the data packet at a repeater connected to the first segment;

storing the data packet in a register of the repeater on a first clock cycle;

transmitting the data packet from the repeater over a second segment of the unidirectional packet bus on a second clock cycle subsequent to the first clock cycle; and receiving the data packet at a second functional block connected to the second segment; wherein:

a first physical connection distance between the repeater and the first functional block over the packet bus does not exceed a single-clock-cycle length;

a second physical connection distance between the first functional block and the second functional block over the packet bus exceeds the single-clock-cycle length; and wherein a communications protocol between the first functional block and the second functional block is substantially capable of operation for a source-receiver traveltime having a first value and a second value wherein the first value is a first number of clock cycles defining a signal traveltime between the first functional block and second functional through the repeater, and the second value is a second number of clock cycles different from the first number of clock cycles.

* * * * *